US010140014B2

(12) United States Patent
Oh et al.

(10) Patent No.: US 10,140,014 B2
(45) Date of Patent: Nov. 27, 2018

(54) METHOD AND TERMINAL FOR ACTIVATING APPLICATION BASED ON HANDWRITING INPUT

(71) Applicant: Pantech Inc., Seoul (KR)

(72) Inventors: Jeong Won Oh, Seoul (KR); Woo Kyung Jeong, Seoul (KR)

(73) Assignee: Pantech Inc., Seoul (KR)

( * ) Notice: Subject to any disclaimer, the term of this patent is extended or adjusted under 35 U.S.C. 154(b) by 0 days.

(21) Appl. No.: 15/264,235

(22) Filed: Sep. 13, 2016

(65) Prior Publication Data
US 2017/0003868 A1  Jan. 5, 2017

Related U.S. Application Data

(63) Continuation of application No. 13/905,622, filed on May 30, 2013, now Pat. No. 9,448,652.

(30) Foreign Application Priority Data

Jun. 1, 2012 (KR) .......................... 10-2012-0058961

(51) Int. Cl.
G06F 3/0488 (2013.01)
G06F 3/041 (2006.01)
G06F 3/0481 (2013.01)

(52) U.S. Cl.
CPC .......... G06F 3/04883 (2013.01); G06F 3/041 (2013.01); G06F 3/0416 (2013.01); G06F 3/04817 (2013.01)

(58) Field of Classification Search
None
See application file for complete search history.

(56) References Cited

U.S. PATENT DOCUMENTS 5,946,406 A * 8/1999 Frink .................. G06F 3/04883
382/119
7,003,308 B1 * 2/2006 Fuoss .................. G06F 3/04883
345/173
(Continued)

FOREIGN PATENT DOCUMENTS

KR  10-2008-0068495   7/2008
KR  10-2010-0117417   11/2010

OTHER PUBLICATIONS

Non-Final Office Action dated Oct. 1, 2015 in U.S. Appl. No. 13/905,622.
(Continued)

*Primary Examiner* — Patrick Edouard
*Assistant Examiner* — Peijie Shen
(74) *Attorney, Agent, or Firm* — H.C. Park & Associates, PLC

(57) ABSTRACT

A method for controlling an application based on a handwriting input includes recognizing a handwriting input received on a touch panel of a terminal; determining a symbol corresponding to the handwriting input; selecting an application capable of being associated with the symbol; and associating the symbol with a function of the application. A terminal to control an application based on a handwriting input includes a determination unit to recognize a handwriting input received on a touch panel of the terminal, and to determine a symbol corresponding to the handwriting input; and a processor configured to select an application capable of being associated with the symbol, and to associate the symbol with a function of the application.

20 Claims, 14 Drawing Sheets

(56) References Cited

U.S. PATENT DOCUMENTS

| | | | | |
|---|---|---|---|---|
| 7,996,045 B1* | 8/2011 | Bauer | G06F 3/0488 | 455/466 |
| 8,627,235 B2* | 1/2014 | Chang | G06F 3/04883 | 345/173 |
| 8,799,798 B2* | 8/2014 | Ito | G06F 3/04883 | 715/764 |
| 8,893,056 B2* | 11/2014 | Jung | G06F 3/0481 | 715/864 |
| 8,943,092 B2* | 1/2015 | Dai | G06F 17/30477 | 382/113 |
| 8,954,894 B2* | 2/2015 | Lorenz | G06F 3/0486 | 345/179 |
| 9,021,402 B1* | 4/2015 | Li | G06F 3/04883 | 715/863 |
| 9,075,828 B2* | 7/2015 | Yun | G06F 17/30247 | |
| 9,116,613 B2* | 8/2015 | Jung | G06F 3/04886 | |
| 9,176,608 B1* | 11/2015 | Baldwin | G09G 5/00 | |
| 2003/0093419 A1* | 5/2003 | Bangalore | G01C 21/3664 | |
| 2003/0106020 A1* | 6/2003 | Silverbrook | B41J 2/17513 | 715/230 |
| 2003/0193484 A1* | 10/2003 | Lui | G06F 3/04883 | 345/173 |
| 2004/0145574 A1* | 7/2004 | Xin | G06F 3/0488 | 345/173 |
| 2004/0236710 A1* | 11/2004 | Clary | G06F 3/04883 | 706/46 |
| 2005/0022130 A1* | 1/2005 | Fabritius | G06F 3/038 | 715/739 |
| 2005/0275638 A1* | 12/2005 | Kolmykov-Zotov | G06F 3/04883 | 345/179 |
| 2006/0242607 A1* | 10/2006 | Hudson | G06F 3/04817 | 715/863 |
| 2008/0055280 A1* | 3/2008 | Bi | G06F 3/03545 | 345/179 |
| 2008/0174568 A1* | 7/2008 | Kim | G06F 3/04886 | 345/173 |
| 2009/0122019 A1* | 5/2009 | Lin | G06F 1/1616 | 345/173 |
| 2010/0011304 A1* | 1/2010 | van Os | G06F 3/04817 | 715/762 |
| 2010/0026642 A1* | 2/2010 | Kim | G06F 3/0416 | 345/173 |
| 2010/0058231 A1* | 3/2010 | Duarte | G06F 3/0481 | 715/800 |
| 2010/0162182 A1* | 6/2010 | Oh | G06F 3/04883 | 715/863 |
| 2010/0169841 A1* | 7/2010 | Singh | G06F 3/04883 | 715/863 |
| 2010/0262591 A1* | 10/2010 | Lee | G06F 3/04883 | 707/706 |
| 2010/0262905 A1* | 10/2010 | Li | G06F 3/0482 | 715/702 |
| 2010/0306705 A1* | 12/2010 | Nilsson | G06F 3/0488 | 715/835 |
| 2010/0306718 A1* | 12/2010 | Shim | G06F 3/04883 | 715/863 |
| 2010/0311470 A1* | 12/2010 | Seo | G06F 3/04883 | 455/566 |
| 2011/0041102 A1* | 2/2011 | Kim | G06F 3/04883 | 715/863 |
| 2011/0314427 A1* | 12/2011 | Sundararajan | G06F 9/451 | 715/863 |
| 2012/0166968 A1* | 6/2012 | Lee | G06F 3/04883 | 715/752 |
| 2012/0302167 A1* | 11/2012 | Yun | G06F 3/04883 | 455/41.2 |
| 2012/0331548 A1* | 12/2012 | Tseng | G06F 21/31 | 726/19 |
| 2013/0103712 A1* | 4/2013 | Li | G06F 17/30967 | 707/769 |
| 2013/0106710 A1* | 5/2013 | Ashbrook | G06F 3/0488 | 345/173 |
| 2013/0120279 A1* | 5/2013 | Plichta | G06F 3/04883 | 345/173 |
| 2013/0227418 A1* | 8/2013 | Sa | G06F 3/0488 | 715/728 |
| 2013/0326430 A1* | 12/2013 | Devi | G06F 3/0488 | 715/863 |
| 2014/0282084 A1* | 9/2014 | Murarka | H04L 51/32 | 715/752 |
| 2014/0372896 A1* | 12/2014 | Raman | G06F 3/0488 | 715/741 |
| 2015/0058789 A1* | 2/2015 | Namgung | G06F 3/0484 | 715/781 |
| 2015/0205520 A1* | 7/2015 | Yim | G06F 3/0484 | 715/268 |

OTHER PUBLICATIONS

Notice of Allowance dated May 24, 2016 in U.S. Appl. No. 13/905,622.

* cited by examiner

METHOD AND TERMINAL FOR ACTIVATING APPLICATION BASED ON HANDWRITING INPUT

CROSS-REFERENCE TO RELATED APPLICATIONS

This application is a continuation of U.S. patent application Ser. No. 13/905,622, filed on May 30, 2013, which claims priority from and the benefit of Korean Patent Application No. 10-2012-0058961, filed on Jun. 1, 2012, which is hereby incorporated by reference in its entirety for all purposes as if fully set forth herein.

BACKGROUND

Field

Exemplary embodiments of the present invention relate to a method and a terminal for activating an application based on handwriting input.

Discussion of the Background

When a message is received in a communication terminal, a user may view the received message through a screen indicating the arrival of the message and select a reply button to respond to the received message.

If the user selects the reply button, an application for sending a reply message may be executed, and the user may select a message typing interface or a content input box as the application for sending the message is executed, and then a reply may be created through the interface. When the user completes the reply and sends the message via multiple manipulations and conversions of displayed images, the user may have an inconvenient experience of manipulations including launching and terminating one or more applications, e.g., terminating the application for sending the message. The user may be incapable of replying to the received message without running a separate application or a separate window for sending the message. Further, even in a handwriting recognition-enabled terminal, an application supporting a handwriting input may need to be activated for recognizing the handwriting input in order to write a reply through the recognized handwriting after a message is received. Also, multiple manipulation processes described above is involved in sending a message, e.g., launching and terminating a handwriting recognition application, thereby causing an inconvenience to the user.

FIG. 1 is a diagram illustrating a process of generating a reply message when a new message is received in a communication terminal according to the related art.

Referring to FIG. 1, the communication terminal (hereinafter "a terminal") supports a user interface (UI) to notify a user of a message arrival event, such as an arrival of a message, and to receive a selection input of the user with respect to the event, for example, whether to check the message or to reply.

Specifically, the terminal provides a user notification to the user, such as a notification of arrival of the message, by a pop-up window on a home screen of the terminal as shown in a screen 110 if the message is received by the terminal.

If a user selects a reply button in the pop-up window to reply to the received message, the terminal launches a message application for sending a message as shown in a screen 130.

The user selects a text entry field from the application to input a text message and activates an input editor as shown in a screen 150. When the user inputs a reply in the activated input editor and selects a send button, the reply message is sent to an addressee, "SKY", as shown in a screen 170.

FIG. 2 is a flowchart illustrating a method of generating a reply message when a new message is received in a communication terminal according to the related art.

Referring to FIG. 2, if a new message is received by a terminal through a message application installed in the terminal in an operation 210, the message application analyzes the new message, and activates a user interface (UI) for outputting a user notification if a message arrival notification is allowed for a user in an operation 220. Hereinafter, the UI for user notification may be referred to as a user notification UI.

The user notification UI activated by the message application allocates a resource needed for the UI and initiates operating procedures in operation 230.

Subsequently, the user notification UI may analyze pieces of information to be added in activating the message application in operation 240. The pieces of information may include information related to the received message and notification, for example, information to be displayed and information of a function that may be executed by an interface e, such as a button (e.g., the "REPLY" button, and "CHECK" button in FIG. 1).

The user notification UI is allocated a window other than a window used by an executed application activated in the foreground, thereby preparing a resource for displaying a screen in operation 250. Allocating of the user notification UI may be performed without significantly disturbing the activation and/or the display of the executed application activated in the foreground.

The user notification UI displays information received from the message application on the allocated screen in operation 260.

The user notification UI registers a user event and a selected area in operation 270. Here, the user notification UI registers a basic processing event defined in a relevant UI, for example, an exit event and a selection event, and a touch selection area, such as a button, of the user notification UI analyzed in operation 240.

The user notification UI receives various types of events input through the terminal, for example, a key input and a touch, and determines whether the events input correspond to the registered user events as registered in the operation 270 in operation 280.

If a touch start point where an event is detected in operation 280 is not a registered area of the display screen of the terminal, a subsequent touch event may be ignored. Subsequently, the user notification UI returns all resources allocated when the activation of the UI is initiated, and terminates the operation in operation 290.

If the touch start point where the event is detected in operation 280 is a registered area, the user notification UI determines whether to select or terminate a function of a registered event and performs operations accordingly.

If a function registered in the message application is selected in operation 280, the user notification UI activates the registered function in operation 295 and then terminates the operation in operation 290.

For example, if a message reply function of FIG. 1 is selected in operation 280, activation of the reply function is defined in the analysis of the UI. When the defined activation is performed, the message application is called and launched based on a defined activation type. A conversation list of a relevant number may need to be defined.

As such, when a user notification event occurs, such as a message arrival notification, the user may need to operate the terminal with multiple touch inputs to activate an application or a particular function. Therefore, aspects of the present invention suggest an approach to resolve such issues. The above information disclosed in this Background section is only for enhancement of understanding of the background of the invention and therefore it may contain information that does not form any part of the prior art nor what the prior art may suggest to a person of ordinary skill in the art.

SUMMARY

Exemplary embodiments of the present invention provide a method and terminal for controlling an application based on a handwriting input.

Additional features of the invention will be set forth in the description which follows, and in part will be apparent from the description, or may be learned by practice of the invention.

Exemplary embodiments of the present invention provide a method for controlling an application based on a handwriting input, the method including: recognizing a handwriting input received on a touch panel of a terminal; determining a symbol corresponding to the handwriting input; selecting an application capable of being associated with the symbol; and associating the symbol with a function of the application.

Exemplary embodiments of the present invention provide a method for controlling an application based on a handwriting input in a first terminal, the method including: receiving a message from a second terminal; displaying a notification indicating the message receipt on a touch screen display of the first terminal; receiving a handwriting input on the touch screen display of the first terminal without launching a message application; determining a symbol corresponding to the handwriting input; and associating the symbol with a function of the message application.

Exemplary embodiments of the present invention provide a terminal to control an application based on a handwriting input, the terminal including: a determination unit to recognize a handwriting input received on a touch panel of the terminal, and to determine a symbol corresponding to the handwriting input; and a processor configured to select an application capable of being associated with the symbol, and to associate the symbol with a function of the application.

It is to be understood that both forgoing general descriptions and the following detailed description are exemplary and explanatory and are intended to provide further explanation of the invention as claimed. Other features and aspects will be apparent from the following detailed description, the drawings, and the claims.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the principles of the invention.

DETAILED DESCRIPTION OF THE ILLUSTRATED EMBODIMENTS

Figure 1:
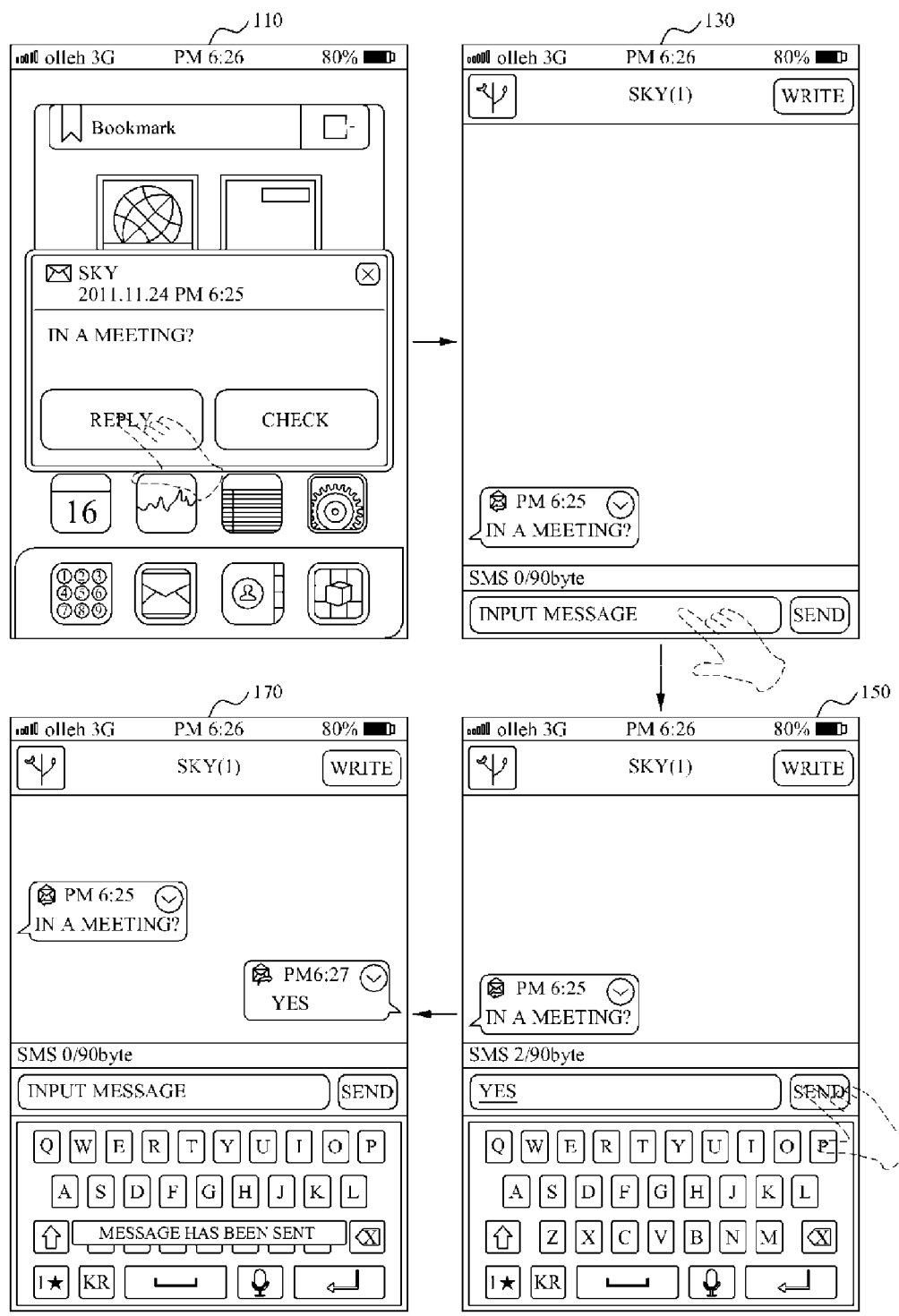
FIG. 1 is a diagram illustrating a process of generating a reply message when a new message is received in a communication terminal according to the related art.

The invention is described more fully hereinafter with reference to the accompanying drawings, in which exemplary embodiments of the invention are shown. This invention may, however, be embodied in many different forms and should not be construed as limited to the exemplary embodiments set forth herein. Rather, these exemplary embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

In the following description, the term "terminal" may collectively include any electronic device capable of processing a handwriting input through a touch screen display, such as a mobile terminal, a tablet, an electronic pad, a plasma display panel (PDP), a personal digital assistant (PDA), a personal computer (PC), a laptop computer, and the like. Also, the units, modules, elements, devices and components of the apparatuses and/or mobile terminals herein described, may include hardware and software, may also include firmware, to perform various operations of the terminal including those described herein, and may be combined or remain separate as described.

Figure 3:
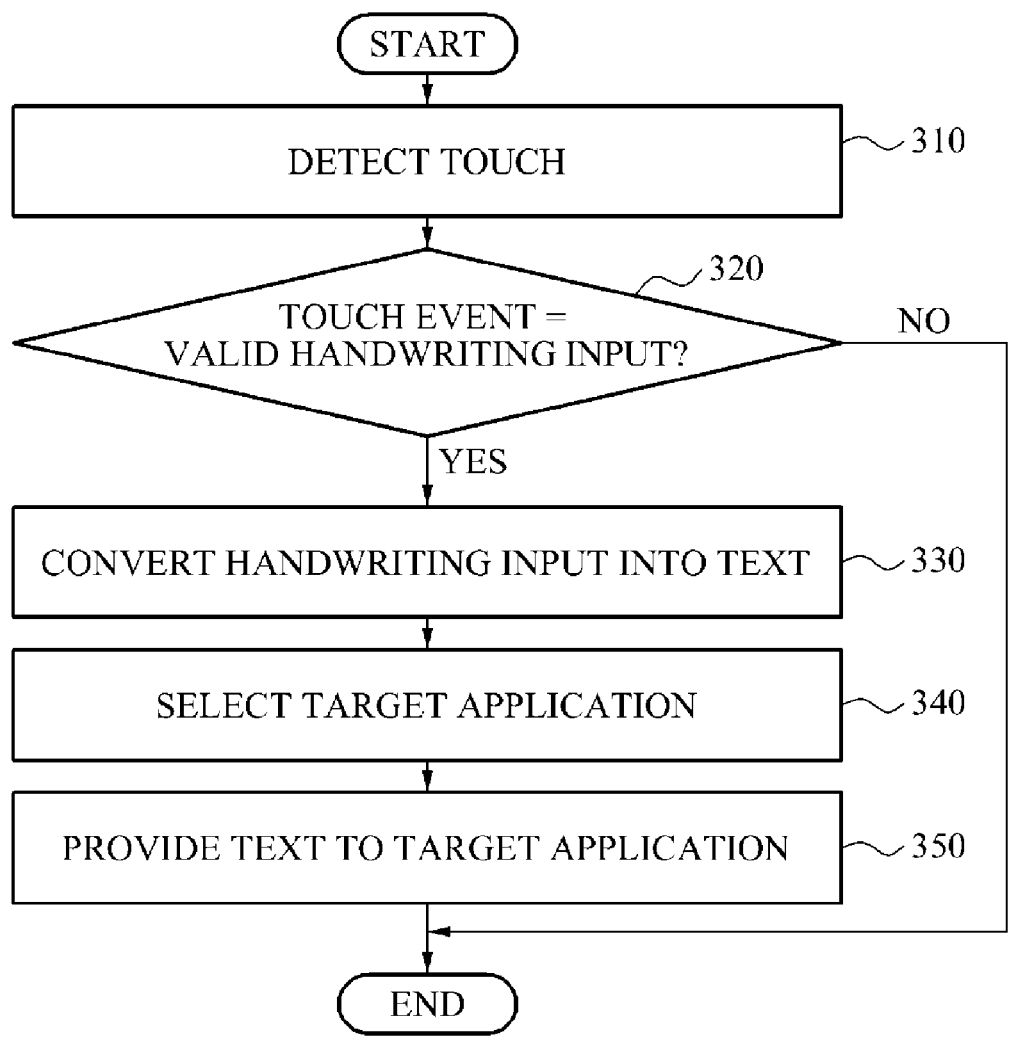
FIG. 3 is a flowchart illustrating a method for activating an application based on a handwriting input according to an exemplary embodiment of the present invention.

FIG. 3 is a flowchart illustrating a method for activating an application based on a handwriting input according to an exemplary embodiment of the present invention.

Referring to FIG. 3, a terminal to activate an application based on a handwriting input (hereinafter, "terminal") may detect a touch event from a touch display in operation 310. Here, the terminal may be configured to receive a handwriting input on a handwriting input area in a separate layer of a touch display, not in an existing layer, e.g., a home screen display layer.

As the touch event is detected in operation 310, the terminal may determine whether the touch event is a valid input of handwriting or a simple touch ("non-handwriting touch") in operation 320.

Here, the "simple touch" includes any touch motion, which is not defined as a handwriting input, for example, icon clicking or home screen flicking.

The terminal may determine whether the touch event occurring in a preset area is a valid input of handwriting in operation 320. Here, the "preset area" may be a part of the display independently allocated to a target application or an entire touch recognition area of the touch display.

The terminal may display a boundary or edge of the entire touch recognition area or the part of the touch display in a distinguishable color or a temporarily flickering mode so that the preset area is recognizable by a user. In particular, a handwriting area for a handwriting input on the touch display may be distinguished by the boundary.

The terminal may determine whether the touch event is a valid input of handwriting by activating a handwriting recognition module in operation 320.

As a result of the determination in operation 320, if the touch event is determined as a valid input of handwriting, the terminal may convert the input of handwriting into a text in operation 330. For example, the terminal may use a handwriting conversion engine to convert the input of handwriting into the text. The "handwriting conversion engine" may be a software engine, which calculates a value corresponding to a coordinate acquired from the touch event input on the touch display to convert the touch event into a predefined symbol, e.g., a text, a number, or a special symbol. A user may define a new symbol that corresponds to a handwriting input.

If it is determined that the touch event is not a valid input of handwriting, e.g., a simple touch, in operation 320, the terminal may terminate a process of activating an application based on a handwriting input. The terminal may select a target application among a plurality of applications in operation 340 if the handwriting input is successfully converted into a text. The selection of the "target application" may be performed based on UIs for basic functions of the terminal presented on a screen of the touch display or icons and buttons for activating various types of applications selected by the user or automatically set by a program.

The terminal provides the text to the target application in operation 350.

The method of activating the application based on the input of handwriting described herein may be widely applied to Android-based terminals as well as Microsoft® Windows-based terminals, Real-Time Executive Operating System (REX OS)-based feature phones, iOS® based phones, and terminals using other types of operating systems.

Figure 4:
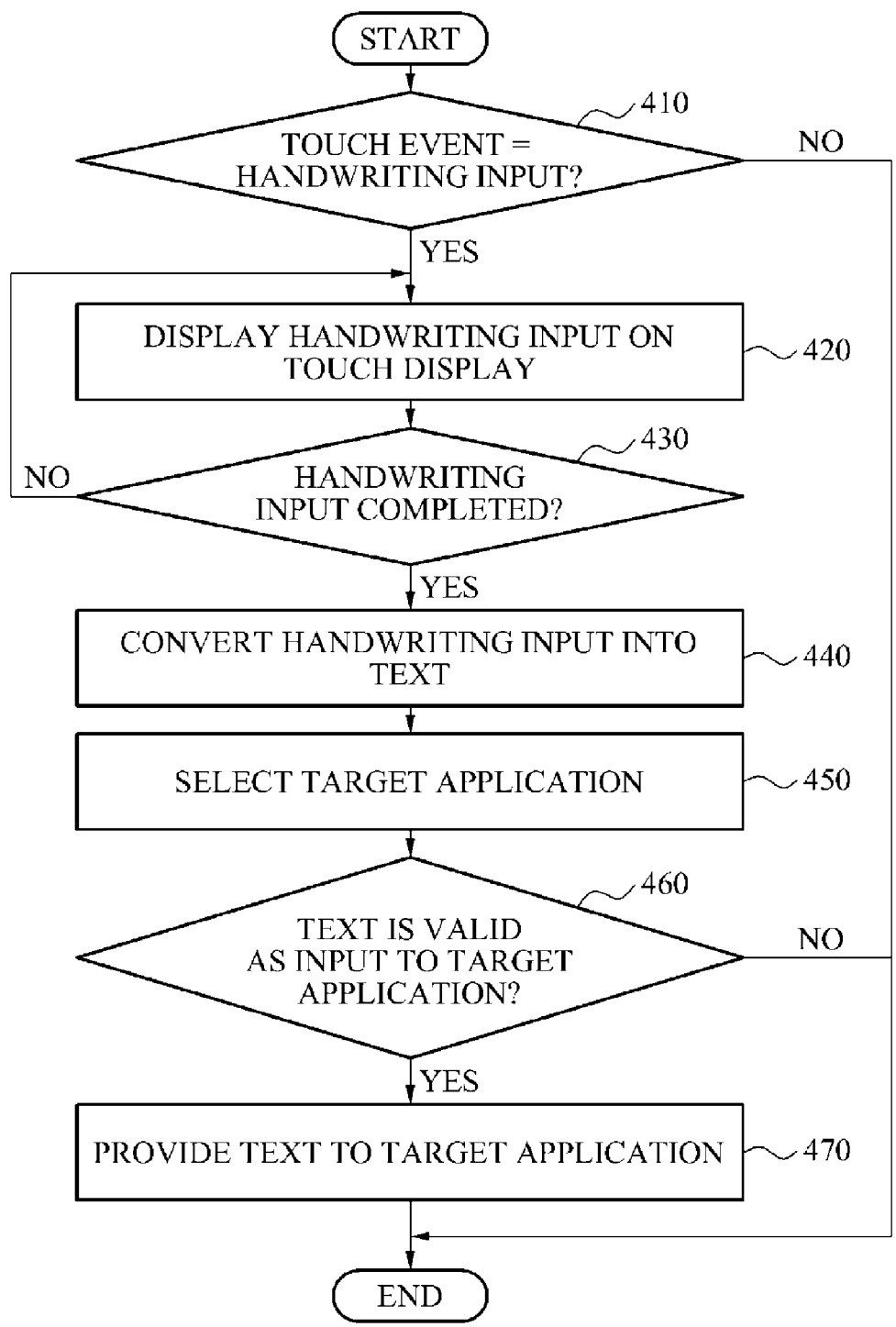
FIG. 4 is a flowchart illustrating a method for activating an application based on a handwriting input according to an exemplary embodiment of the present invention.

FIG. 4 is a flowchart illustrating a method for activating an application based on a handwriting input according to an exemplary embodiment of the present invention.

Referring to FIG. 4, a terminal determines whether a touch event detected by a touch screen display is an input of handwriting in operation 410. If it is determined that the touch event is not an input of handwriting in operation 410, e.g., a simple touch, the terminal may terminate a process of activating an application based on a handwriting input.

If it is determined that the touch event is an input of handwriting in operation 410, the terminal may display the input of handwriting on the touch display in operation 420. If the touch event is a valid input of handwriting, the terminal may display contents of the handwriting input, e.g., a recognized text from the handwriting input, on a screen to enable the user to identify the recognized contents and to perform a corresponding function. The terminal may display the handwriting input as a handwriting image on a touch screen corresponding to the location of the handwriting input without converting the handwriting input into a text until the handwriting input is completed or converting the handwriting input into a corresponding symbol when each symbol is identified from the handwriting input.

In operation 430, the terminal may determine whether the input of handwriting is completed.

A method of determining whether the input of handwriting is completed in operation 430 will be described in more detail with reference to FIG. 9.

If it is determined that the input of handwriting is completed in operation 430, the terminal converts the input of handwriting into a text in operation 440. A handwriting conversion engine may be used to convert the input of handwriting into the text, and the converted text may be stored. If it is determined that the input of handwriting is not completed, the terminal returns to the operation 420 and enters a stand-by mode. The handwriting input is displayed on the touch display until the handwriting input is completed.

The terminal selects a target application among a plurality of applications in operation 450.

In operation 460 the terminal may determine whether the text input to the target application selected in operation 450 is a valid input for the target application. For example, the terminal may determine whether a function corresponding to the text is registered as registration information for the application selected by the user.

The text input for the target application may be determined to be valid if the text or the format of the text is registered in a database for the target application as the registration information of the target application. For example, if a function of the target application corresponding to the text exists in information on functions of the target application included in the registration information, the text input to the target application may be determined to be valid.

If the function of the target application corresponding to the text exists in the information on functions of the target application included in the registration information, the terminal may extract information about the function of the target application corresponding to the text from the registration information on the target application. For example, the "function" of the target application may include an Action pertaining to an execution command in a mobile operating system, e.g., an Android platform.

If it is determined that the text input to the target application is not valid in operation 460, the terminal may terminate a process of activating an application based on a handwriting input.

If it is determined that the text input to the target application is valid in operation 460, the terminal may provide the text to the target application in operation 470.

Figure 5:
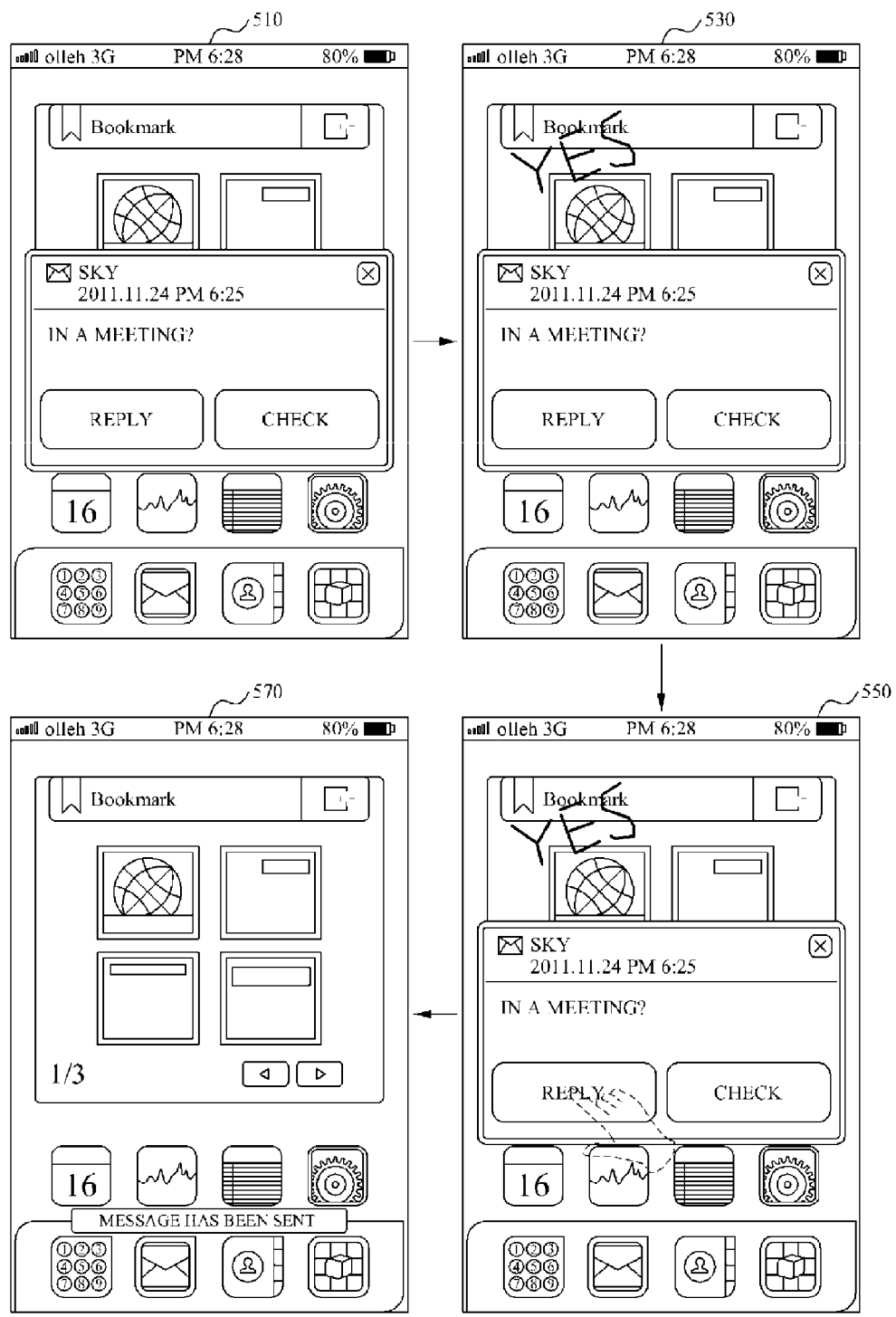
FIG. 5 is a diagram illustrating a process of a communication terminal that replies to a message by activating an application based on a handwriting input in response to a message receipt notification according an exemplary embodiment of the present invention.

FIG. 5 is a diagram illustrating a process of a communication terminal that replies to a message by activating an application based on a handwriting input in response to a message receipt notification according an exemplary embodiment of the present invention.

Referring to FIG. 5, when a message arrives at a communication terminal ("a terminal") of a user, the terminal provides a user notification, e.g., a message arrival notification on a screen 510. A pop-up window may be displayed on a portion of an upper layer of the home screen layer to display the message arrival notification. If the message arrival notification is displayed on the screen 510 as shown in FIG. 5, a handwriting recognition module may be executed to recognize a handwriting input received on a touch screen display.

The window is configured to include a plurality of layers. For example, an indicator bar on which the remaining power of a battery and a reception status of an antenna are displayed may be located on a top layer and thus may be always displayed on the screen. An application may be displayed in a lower layer than the indicator bar and hidden when the indicator bar is pulled down over the application.

Further, in an exemplary embodiment adopting such a layer concept, an additional transparent layer may be launched over a layer in which a call application is implemented, thereby receiving a handwriting input through the transparent layer without disturbing the call application. The user notification UI displays information received from the message application on the allocated screen. If the user notification UI displays the information received from the message application on a part of the screen, an unused or the remaining area of the allocated window may be displayed to be transparent and the display area for the displayed information is drawn.

After the display of the message arrival notification, the user may input a handwriting input, "YES", as a reply on a touch screen display as shown on a screen 530. Here, an area for the user to input the reply may be a separately assigned area from an area for displaying the message arrival notification, for example, an area disposed above the area for the message arrival notification. However, the aspects are not limited as such. The area to input the handwriting input as a reply may be an entire touch recognition area of the touch display.

If the user activates a reply button as shown on a screen 550, the terminal identifies whether a handwriting input action exists in registration information about the reply button. In this example, the registration information may include English alphabets, and each of the characters, "Y", "E", and "S", may be recognized. If information corresponds to the handwriting input action exist in the registration information, the terminal recognizes the handwriting input and activates a reply message transmitting action to a telephone number corresponding to the message arrival notification in background by the input written contents. Further, by associating a message corresponding to the handwriting input to the message transmitting action, a reply to the telephone number is sent with the message corresponding to the handwriting input. Here, the reply button may be associated with a handwriting input action and a reply message transmitting action such that a handwriting recognition module and a message transmission function of a message application are activated.

As the reply message transmitting action is activated, the message notification is terminated, and the terminal displays a result of the activation in background, for example, a result of a reply message transmission as shown on a screen 570. Further, the message corresponding to the handwriting input may also be displayed as the result.

Figure 2:
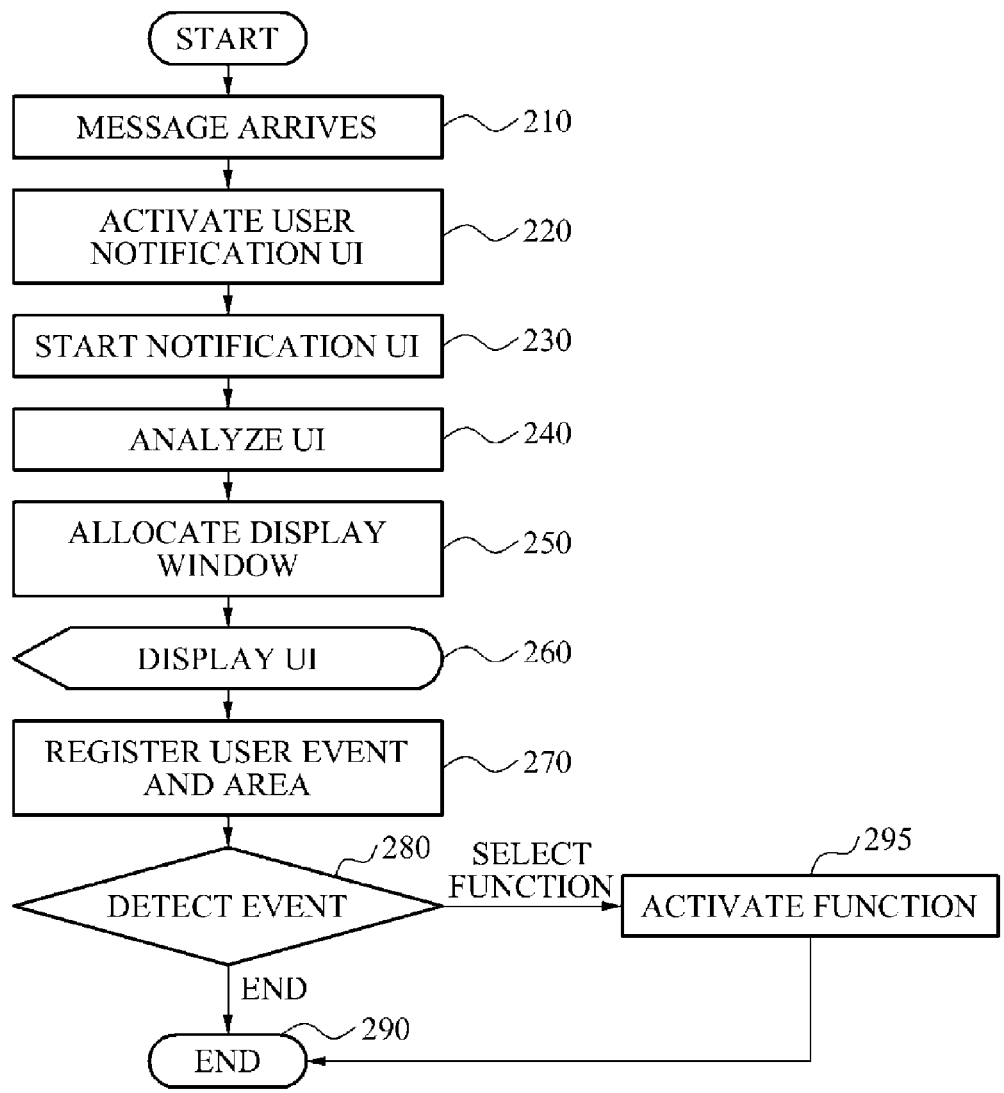
FIG. 2 is a flowchart illustrating a method of generating a reply message when a new message is received in a communication terminal according to the related art.

As described above with reference to FIG. 1 and FIG. 2, a message reply process with respect to a message arrival notification generally involves a plurality of manipulation operations: 1. Notification UI, 2. Select a reply, 3. Activate a message application, 4. Select an input, 5. Input a reply message, 6. Select a send, 7. Terminate the message application, and 8. Go back to a state before a message arrives.

However, according to the method of activating the application based on the input of handwriting, a reply to a message may be sent by implementing a reduced process including: 1. Notification UI, 2. Input a message via a handwriting input, 3. Select a reply to send a message, 4. Go back to a state before a message arrives. Here, a message transmission may be processed as a background function.

Further, the user may process a function on the notification UI directly without activating a separate message application.

Although a message arrival notification has been illustrated in the above, a simple UI, such as an on-the-phone or screen menu, may be expanded to various functions, thereby providing a user with improved convenience. Hereinafter, examples of the user interface associated with a handwriting input will be described.

Figure 6:
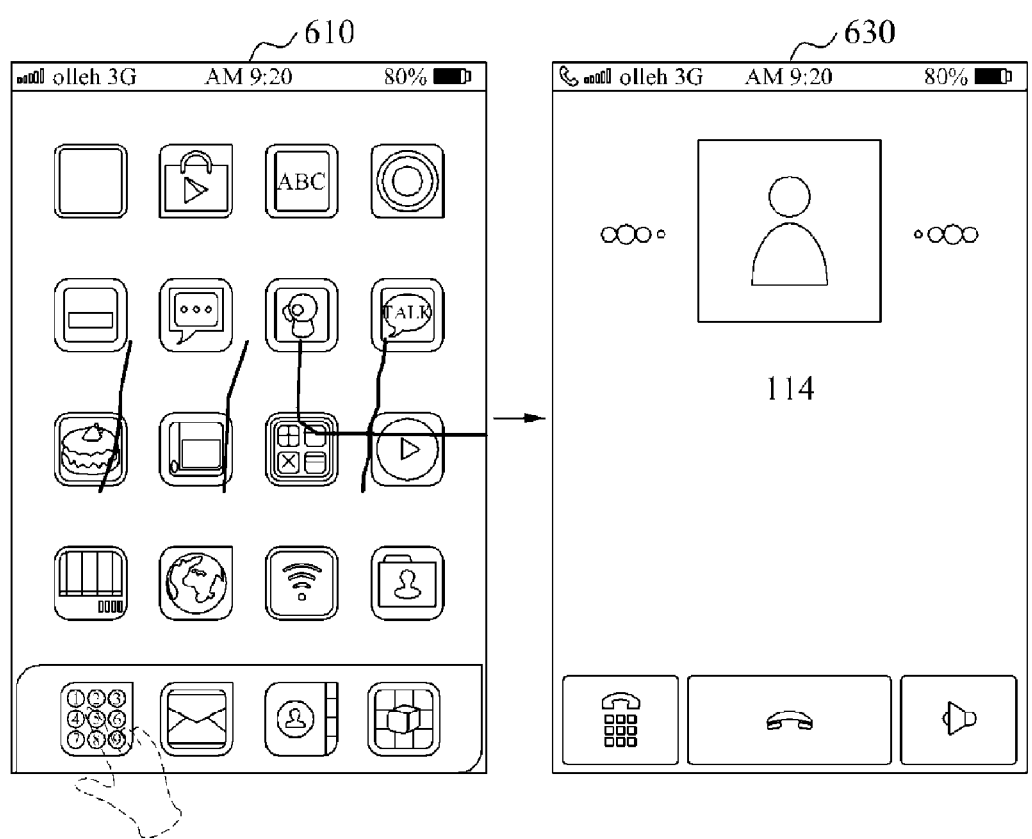
FIG. 6 is a diagram illustrating a processing screen of activating an application based on a handwriting input when a dial button is selected after receiving the handwriting input according an exemplary embodiment of the present invention.

FIG. 6 is a diagram illustrating a processing screen of activating an application based on a handwriting input when a dial button is selected after receiving the handwriting input according an exemplary embodiment of the present invention.

Referring to FIG. 6, a handwriting input may be associated with a selected application. For example, a handwriting input may be linked to a phone application according to a selection of the dial button associated with the phone application for a registered action corresponding to the button to be performed.

As an example, if a user generates a handwriting input corresponding to a phone number, e.g., 114, and 911, on a touch screen display as shown in a screen 610 and then selects the dial button with a finger or a pen. Here, the action registered in the dial button may include an action of generating a call associated with the number recognized from the handwriting input, and registration information about the dial button may include a telephone number input action for generating a call. Thus, if the written number, e.g., 114, is provided to the target application by selecting the dial button associated with the target application, the phone application, the terminal may generate a call as shown in a screen 630.

Figure 7:
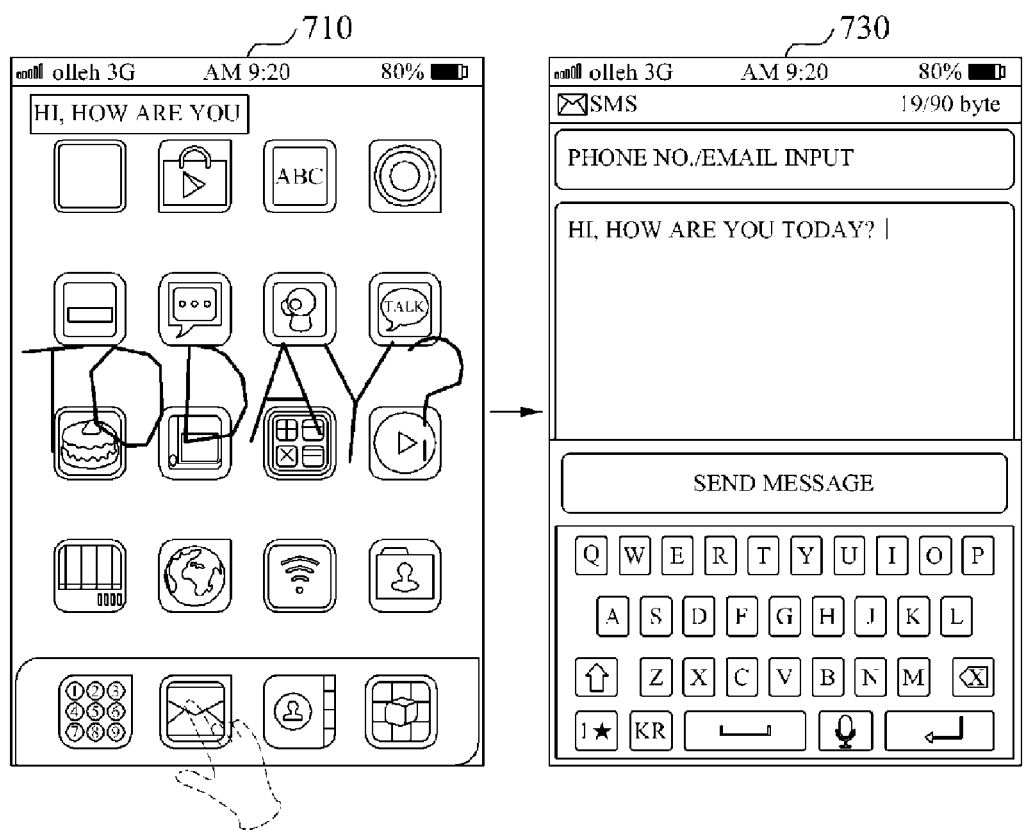
FIG. 7 is a diagram illustrating a processing screen of activating an application based on a handwriting input when a message icon is selected after receiving the handwriting input according an exemplary embodiment of the present invention.

FIG. 7 is a diagram illustrating a processing screen of activating an application based on a handwriting input when a message icon is selected after receiving the handwriting input according an exemplary embodiment of the present invention.

Referring to FIG. 7, the user may input handwriting on a home screen of a touch screen display, and the terminal may convert the handwriting input into a text in a predetermined time after the user inputs the handwriting.

The terminal may convert the handwriting input into the text and store the text or display the converted text, for example, "Hi, how are you today?" on the home screen as shown in a screen 710. The converted text may be displayed in a predetermined or set area with respect to the home screen or other application screens. For example, the converted text may be displayed in a blank area of the home screen as shown in the screen 710.

If the text displayed on the touch display includes a substantial length of handwriting, an initial portion of the handwriting, e.g., "Hi, how are you," may be displayed in the predetermined area with smaller font size among the entire written contents. For example, "Hi, how are you" may be displayed with a smaller font size and the remaining portion, "TODAY?" may be displayed with a larger font size, as displayed on the screen 710. Such an arrangement enables the user to verify whether the handwriting is input correctly.

Further, if the user completes an input of handwriting on the touch screen display and selects the message icon and registration information of the message icon includes a message input action, the terminal may link the recognized text with an application driver. Accordingly, an action registered in accordance with the message icon is activated.

If the user inputs the handwriting and then selects the message icon, the terminal may activate a message write action using the texts converted from the handwriting input as displayed on a screen 730. The activation of the message write action may be performed with reference to the registration information of the message icon.

After linking the text converted from the handwriting input with the application driver, the terminal may receive an input of handwriting about additional information from the user in a touch recognition area or a preset area of the touch screen display to include the additional information. The preset area may be independently allocated to the target application.

Further, if the user inputs information via handwriting on the home screen and then selects a note icon, the input information may be stored as a note in a note application. When selecting an icon, a launcher, e.g., an icon driver, may have a priority of an action in registration information about the selected application and provide an extending function enabling an application with an information processing action to be executed.

A pen function may be used to capture a screen through a hardware key or a pen button and to display the captured screen in the background of a note application by activating the note application to enable handwriting to be input. In particular, the pen function provides a function of enabling characters to be written by hand, with the note application supporting handwriting input, formatting the handwritten characters into an image, and storing and using the image. However, the pen function may be limited to an image sharing function only. Thus, the user may not be able to activate a function registered in a particular application, such as a function of converting input contents into a text and sending the text as a message, or may not be able to provide handwritten contents to the particular application without activating the particular application.

Moreover, if the pen function is activated by an application enabling handwriting input, e.g., a note application, the pen function may be realized within the note application. Unlike the pen function described above, a handwriting function may be implemented independently of an operation of a target application and may be implemented without activating an additional application and execute an action of an application downloaded from an application market.

Figure 8:
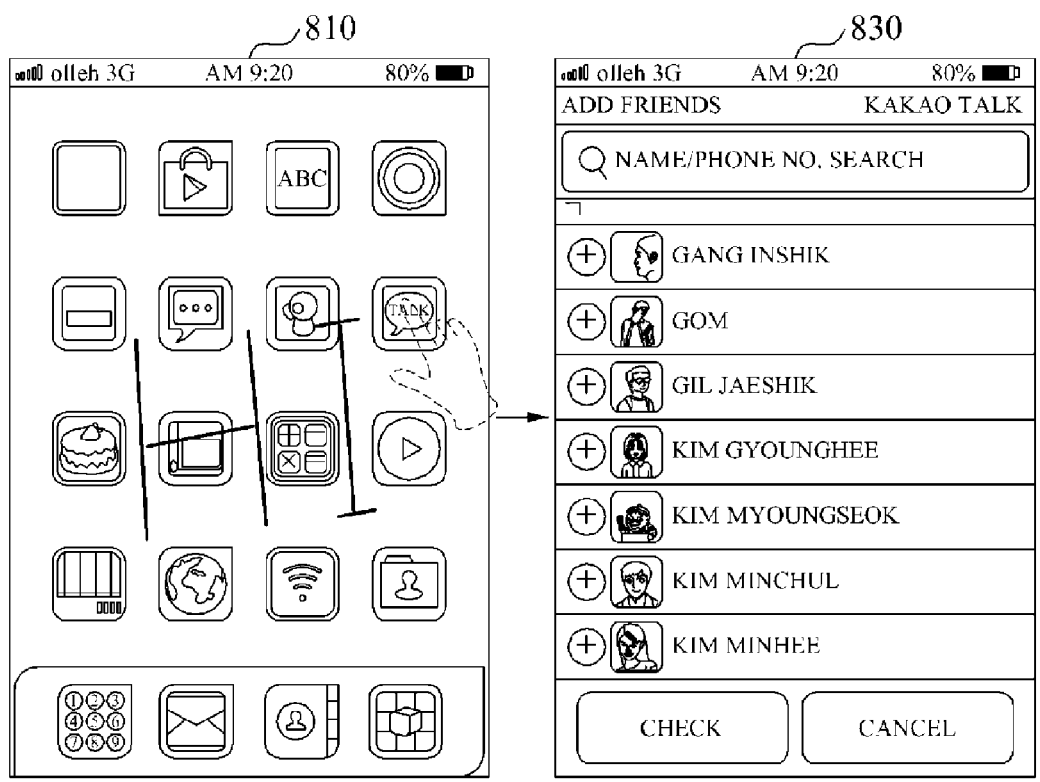
FIG. 8 is a diagram illustrating a processing screen of activating an application based on a handwriting input when a messenger icon is selected after receiving the handwriting input according to an exemplary embodiment of the present invention.

FIG. 8 is a diagram illustrating a processing screen of activating an application based on a handwriting input when a messenger icon is selected after receiving the handwriting input according to an exemplary embodiment of the present invention.

Referring to FIG. 8, a user may input "Hi" in handwriting on a touch screen display as shown in a screen 810 and then select a messenger icon. Registration information about the messenger icon may include a message input action, an interlocutor selection action, an interlocutor addition action, and a message send action, and the interlocutor selection action may be defined as a registered action. If the interlocutor selection action is defined as the registered action, the terminal may activate the interlocutor addition action of adding an interlocutor to whom input contents are sent as shown in a screen 830 in response to the selection of the messenger icon after receiving the handwriting input. Here, the terminal may send the text converted from the handwriting input, e.g., the text "Hi," to an interlocutor selected when the interlocutor addition action is activated.

As described above, the terminal may include a handwriting recognition function and implement various functions including activation of an application through the handwriting recognition. The user may process a function with fewer manipulations via the handwriting recognition function.

Figure 9:
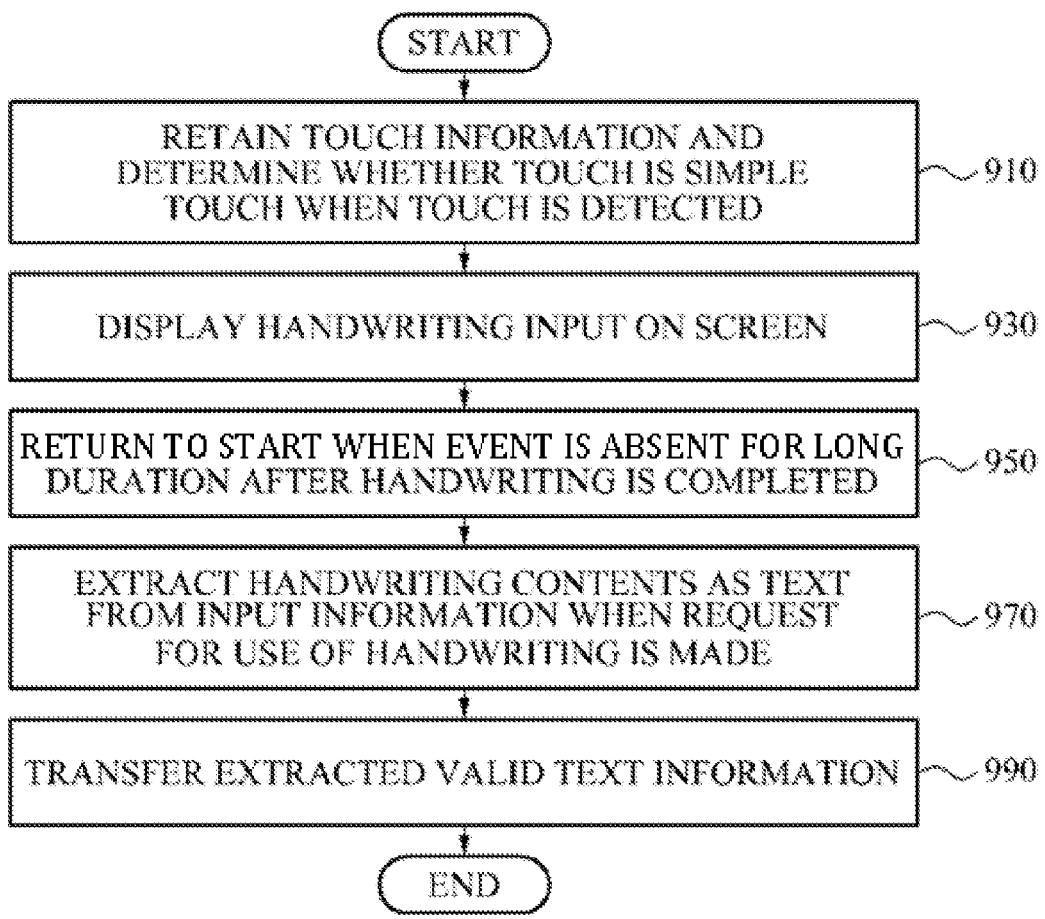
FIG. 9 is a flowchart illustrating a process of a handwriting recognition module that recognizes and processes a handwriting input in association with an application based on the handwriting input according to an exemplary embodiment of the present invention.

FIG. 9 is a flowchart illustrating a process of a handwriting recognition module that recognizes and processes a handwriting input in association with an application based on the handwriting input according to an exemplary embodiment of the present invention.

Figure 12:
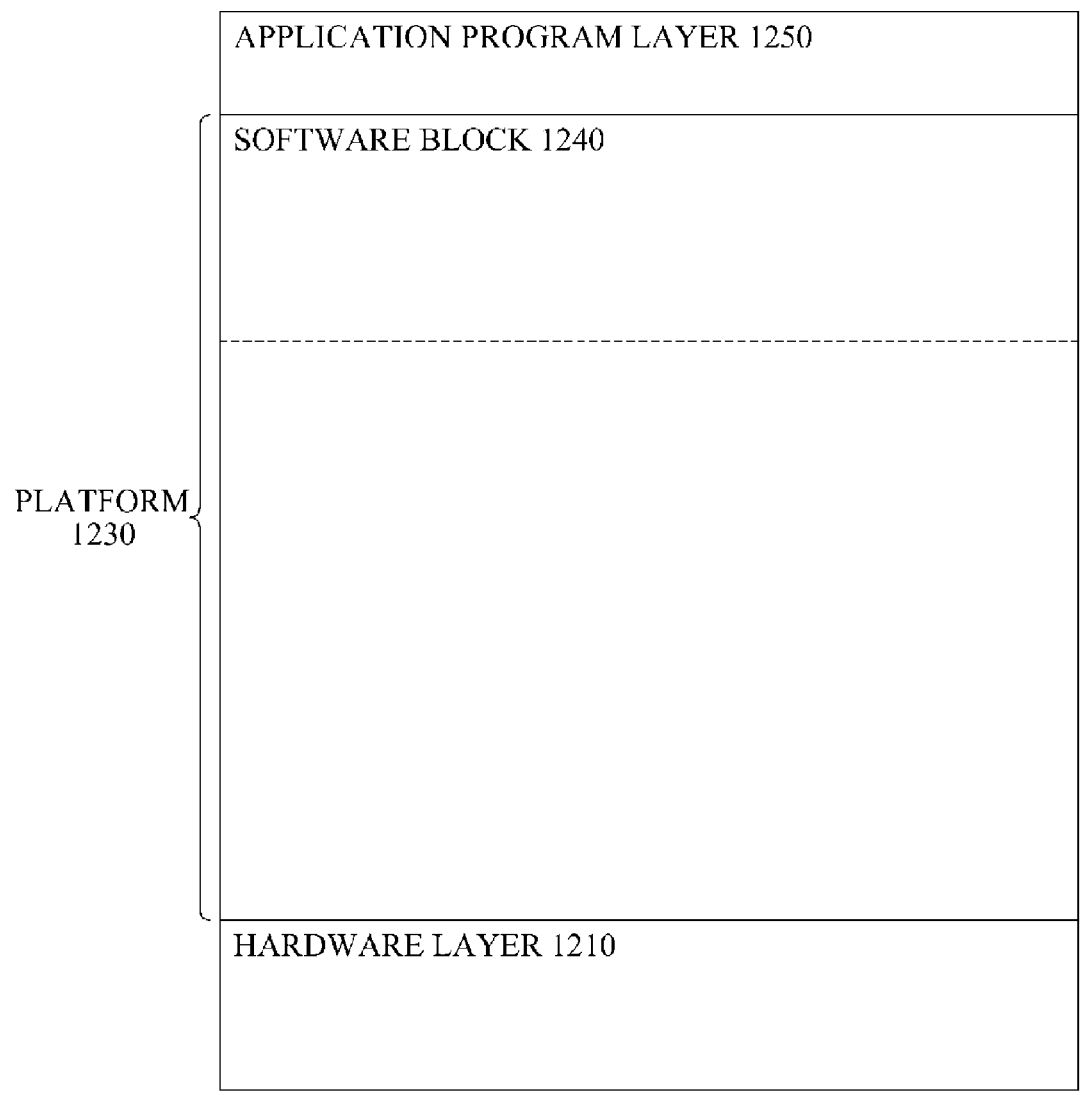
FIG. 12 is a diagram illustrating an abstraction layer or a hierarchy of a mobile device according to an exemplary embodiment of the present invention.

A handwriting recognition module, which is configured in a software block 1240 of FIG. 12, may be activated through settings in an upper application.

The handwriting recognition module may include a touch recognition unit, a display unit, a handwriting determination unit, an extraction unit, and a transfer unit (not shown).

Referring to FIG. 9, if a touch event is detected on a touch screen display, the touch recognition unit of the handwriting recognition unit may recognize and temporarily store touch information of handwriting input, and determine whether the touch event is a valid input of handwriting or a simple touch in operation 910.

Specifically, the touch recognition unit of the handwriting recognition module may recognize the start of the touch event when a touch ("Touch Down") on the touch screen display is recognized. As the start of the touch event is recognized, the touch recognition unit traces and retains handwriting input information, such as a coordinate change based on a drag ("Touch Move") motion. Subsequently, if a release of the touch ("Touch Up") is recognized, the touch recognition unit waits for a Touch Down for a valid time to input next handwriting.

Here, a "Touch Down" may refer to a state of starting a touch event by the user touching the touch screen display.

Further, a "Touch Move" may refer a state of the movement of the touch on the touch screen display while touching the touch screen display, and a "Touch Up" may refer to a state of the touch being detached from the touch screen display after the "Touch Down" or the "Touch Up."

If the valid time for another input of handwriting expires without receiving a handwriting input, the touch recognition unit may initialize a handwriting recognition process. The touch event information may be deleted if the handwriting recognition process is completed.

If the user inputs another handwriting input within the valid time, that is, a Touch Down on the touch screen display is detected, the touch recognition unit determines whether the handwriting input is a valid handwriting input, and temporarily stores the touch event information generated by the subsequent handwriting input and displays the handwriting input on the touch screen display through the display unit in operation 930.

The handwriting determination unit of the handwriting recognition module determines whether the handwriting input is completed and returns to the START operation show in FIG. 9 if a touch event is absent for a long duration, that is, a preset period of time, after completion of the handwriting. Further, the handwriting determination unit determines a cancellation of the current operation if no input is received after the preset period of time elapses in operation 950.

If a request for use of handwriting is made from a target application or an action corresponding to a text included in registration information about the target application, the extraction unit of the handwriting input module extracts the contents of the handwriting as a text from the handwriting input in operation 970. For example, if the user activates an action or function associated with a handwriting input, a notification UI requests the use of handwriting, and accordingly the terminal may convert the contents of the handwriting into a text through a handwriting detection engine.

The transfer unit of the handwriting recognition module delivers the contents to the application in a current state when the extracted contents is determined to be a correct text, and delivers a message that the extracted text is erroneous when the converted handwriting input does not correspond to a correct text in operation 990. If the extracted text includes an error in the conversion process, the conversion error may be corrected by the user and re-delivered to the application.

Figure 10:
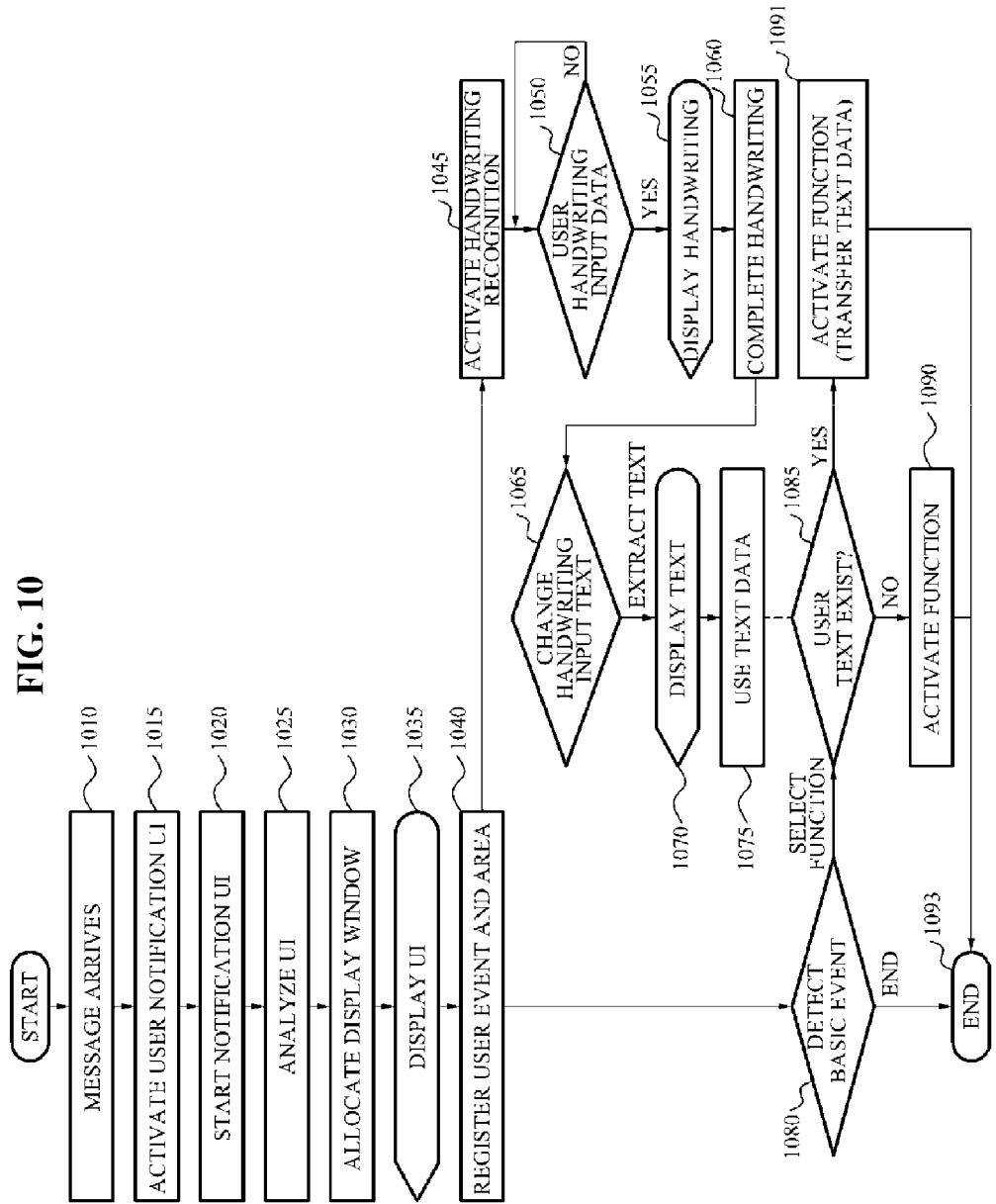
FIG. 10 is a flowchart illustrating a method for activating an application based on a handwriting input when a button of a user notification user interface (UI) is selected according to an exemplary embodiment of the present invention.

FIG. 10 is a flowchart illustrating a method for activating an application based on a handwriting input when a button of a user notification UI is selected according to an exemplary embodiment of the present invention. Operations 1010 and 1015 may be performed by a message application, and operations 1020 to 1040 may be performed by the user notification UI. Further, operations 1045 to 1075, 1085, and 1091 are operations of a handwriting recognition module, which may be performed by the software block 1240 of FIG. 12.

Referring to FIG. 10, if a new message arrives through a message application installed in a terminal in operation 1010, the message application analyzes the new message, and activates a user notification UI if a message arrival notification is determined to be displayed for the user in operation 1015.

The user notification UI activated by the message application allocates a resource for the UI and starts an operation in operation 1020.

The user notification UI analyzes pieces of information added in activating the message application in operation 1025. The pieces of information may include information to be displayed and information on a function, e.g., a button.

The user notification UI is allocated to a window other than a window used by an application being activated in the foreground. Thus, a resource for displaying a screen is prepared in operation 1030. Allocating of the user notification UI is performed to prevent a disturbance of the current foreground application by the activation and the display of the message application.

The user notification UI displays information received from the message application on the allocated screen in operation 1035.

The user notification UI registers a user event and a selected region in operation 1040.

Here, the user notification UI registers a basic processing event defined in a relevant UI, such as an exit event and a selection event, and a touch selection area, such as a button, of the user notification UI analyzed in operation 1025.

The user notification UI determines whether a handwriting recognition function is available by the terminal, and may activate the handwriting recognition module in operation 1045 if the handwriting recognition function is available.

If the handwriting recognition function is not available by the terminal in operation 1040, the user notification UI may determine whether the basic event is detected in operation 1080, select a function and conduct operation 1085, or terminate the operation in operation 1093.

If the handwriting recognition module is activated in operation 1045, the terminal may detect a touch event, a handwriting input, on a screen. The touch event may be detected on a screen other than an area where the touch event is previously detected.

Then, the handwriting recognition module determines whether the touch event corresponds to a valid handwriting input in operation 1050.

If it is determined that the touch event corresponds to a valid handwriting input in operation 1050, the handwriting recognition module displays the handwriting input on the screen in operation 1055. If it is determined that the touch event is not a valid handwriting input in operation 1050 (for example, the input touch event is determined to be a simple touch), the handwriting recognition module may enter a stand-by mode until a valid handwriting input is provided.

If the user selects a function corresponding to the detection of the basic event, e.g., a reply or answer function, in operation 1080, a handwriting input may be completed in operation 1060. If the handwriting input is completed, the user notification UI reports that the basic event is selected by the user and requests conversion of text data from the handwriting recognition module.

After the completion of the handwriting input, the handwriting input may be converted into a text by the handwriting conversion engine in operation 1065.

If the text converted in operation 1065 is a normal text (a portion of or the entire handwriting input is successfully converted into one or more characters of the text data), the text may be extracted and displayed on the screen of the touch display in operation 1070. If the converted text is an abnormal text (a portion of or entire handwriting input is not successfully converted into one or more characters), the text or the corresponding handwriting input may be initialized.

A determination as to whether the displayed text is to be used may be made by user identification after the extraction in operation 1075.

Subsequently, it is determined whether normal text data exists in operation 1085. If normal text data is absent, a defined function is activated without the text data in operation 1090.

If normal text data exists, a defined function is activated in association with the text data in operation 1091.

Further, resources allocated in a process of activating the user notification UI in operation 1020 and the resource of the handwriting recognition module are returned and the user notification UI is terminated in operation 1093.

Although a description of the detection of the basic event in operation 1080 of FIG. 10 is provided regarding selection of a button, similar operations may be performed when an icon is selected.

For example, an icon driver, e.g., an icon launcher, may extract action information registered in registration information about a drive application of an icon through the handwriting recognition module and activate the application by an action using input information, for example, an input of handwriting.

Hereinafter, a method of inputting text to a home screen or a menu, such as an application list, via a handwriting input and selecting an application icon will be described.

When a message icon is selected, a message writing action may be activated and contents of handwriting may be added as message contents. When a contact information icon is selected, a contact information search action may be performed using the contents of handwriting, and a search result may be displayed if a corresponding search result is available. When a dial icon is selected, a call may be made to a telephone number corresponding to the contents of handwriting. When a note icon is selected, the contents of handwriting may be stored in a note application.

In addition, a button mode illustrated in FIG. 10 will be described as follows.

If the user provides a handwriting input on the touch screen display while talking over the phone and then selects a message button, written contents may be sent to an interlocutor or stored separately. Further, if the message button is selected after receiving a handwriting input, the written contents may be sent to a contact designated by the user.

Figure 11:
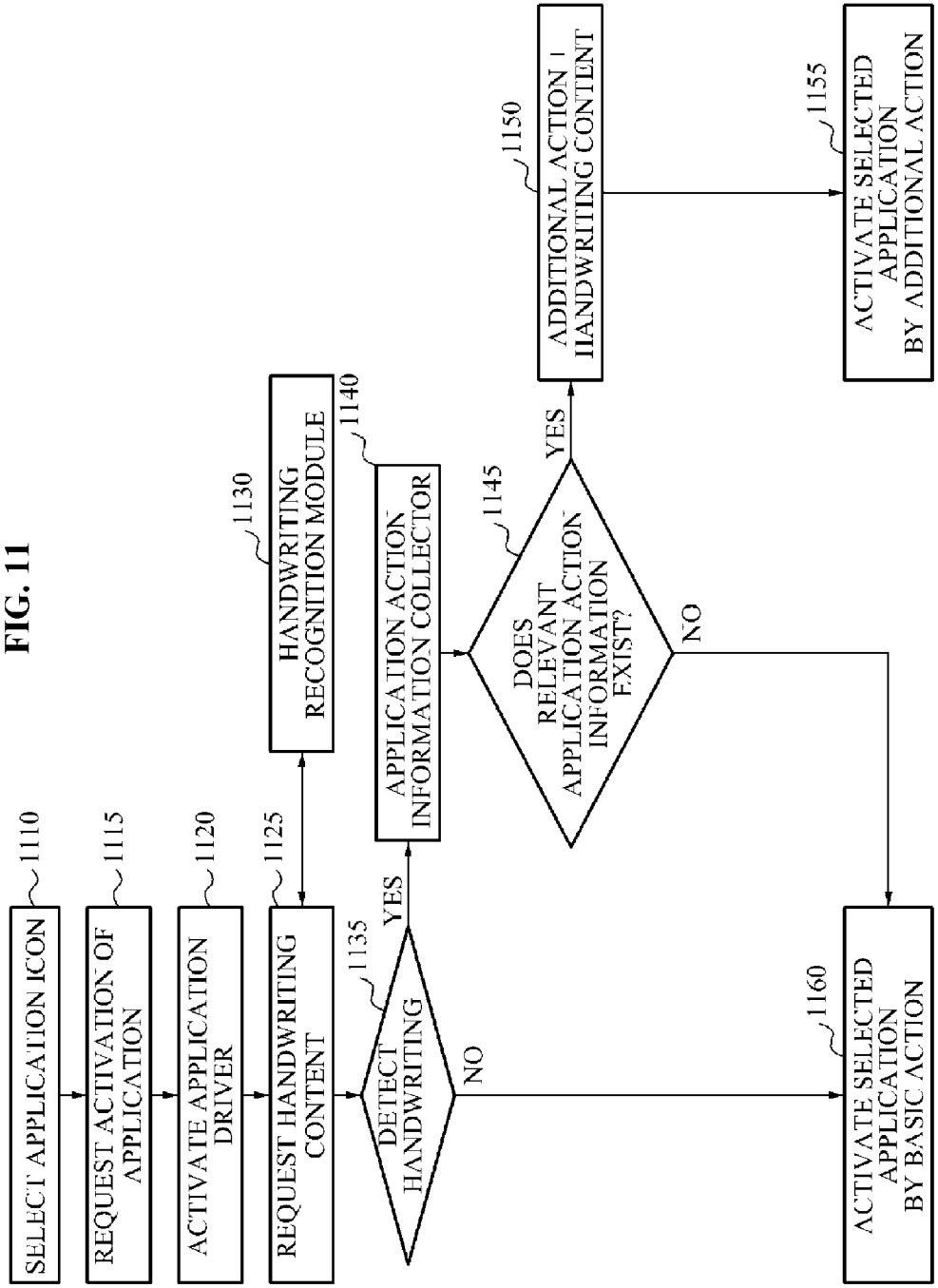
FIG. 11 is a flowchart illustrating a method for activating an application based on a handwriting input when an icon activating an application is selected according to an exemplary embodiment of the present invention.

FIG. 11 is a flowchart illustrating a method for activating an application based on a handwriting input when an icon activating an application is selected according to an exemplary embodiment of the present invention.

In FIG. 11, operations 1110 to 1115 may be performed by the application, while operations 1120 to 1160 may be performed by a software block. The operations performed by the application may be associated with a UI in which a user makes a selection for activating the application.

As the user selects an application icon in operation 1110, a request to activate a corresponding application is generated, thereby requesting an application activating action in operation 1115.

If the application activating action is requested, an application driver is activated in the software block in operation 1120.

In operation 1125 the application driver requests information from a handwriting recognition module as to whether handwriting contents of the user exist. In operation 1130, the handwriting recognition module returns or provides handwriting contents according to the request for the handwriting contents from the application driver.

The application driver provided with the handwriting contents from the handwriting recognition module determines whether handwriting contents exist and detects handwriting in operation 1135. If handwriting contents are not exist or inappropriate for further processing in operation 1135, the application driver activates an application selected based on the request of the user without associating the handwriting contents in operation 1160. If it is determined that handwriting contents exist in operation 1135, the application driver collects application action information in operation 1140.

The application driver determines whether an action using contents of a text is registered in registration information about the application selected by the user in operation 1145.

If corresponding action information does not exist in operation 1145, the application driver processes operation 1160 to activate the application selected by the user by a basic action without associating the handwriting contents.

If corresponding action information exists in operation 1145, the application driver generates an action to activate an action of the application selected by the user based on the handwriting contents and activates the application by the generated action in operation 1150.

If an additional input of the user is required for activating the action of the application in operation 1150, the application driver may receive the additional input from the user. The additional input may be a handwriting input. In conjunction with the application being activated by the action generated in operation 1150, an application action using the handwriting contents is activated in operation 1155.

FIG. 12 is a diagram illustrating an abstract layer or a hierarchy of a mobile device according to an exemplary embodiment of the present invention.

Referring to FIG. 12, the mobile device includes a hardware layer 1210, a platform 1230 for processing and transmitting a signal input in the hardware layer 1210, and an application program layer 1250 including various types of application programs configured to be run based on the platform 1230.

The platform 1230 may be classified into an Android platform, a Windows® Mobile platform, and an iOS® platform according to an operating system of the mobile device, and the respective platforms may have different structures in detailed configurations but serve the same basic functions.

Hereinafter, a mobile operating system will be described with respect to the Android platform as an illustrative example but aspects of the present invention are not limited thereto.

The Android platform 1230 includes a Linux Kernel layer responsible for managing various types of hardware, transmitting a request from an application program to hardware, and transmitting a response of hardware to the application program, a Library layer formed of C or C++ and linking hardware and a Framework layer, and the Framework layer to manage various types of application programs. In addition, the Android platform 1230 may include an Android Runtime layer including a Dalvik Virtual Machine for an operation in an Android execution environment and a Core Library for the Android execution environment.

The Window Mobile platform includes a Window Core layer corresponding to the Linux Kernel layer and an Interface layer linking the Core layer and an Application Program layer and supporting various kinds of languages and functions.

The iOS platform includes a Core OS layer corresponding to the Linux Kernel layer, a Core Service layer similar to the Library layer and the Framework layer, a Media layer providing a multimedia function, and a Cocoa Touch layer for various kinds of applications.

Here, each layer may be also referred to as a block, and the Framework layer and corresponding layers are defined as a "software block 1240." The present invention may be implemented on the platforms of the mobile device described above. However, the platforms described above are exemplary and other platform models may be applicable for the implementation.

The software block 1240 may provide an Application Programming Interface (API) required for developing an application, such as an application framework.

The software block 1240 includes components to create an application. Specifically, the software block 1240 may include an Activity Manager, a Window Manager, a Contents Provider, a View System, a Package Manager, a Telephony Manager, a Resource Manager, a Location Manager, and a Notification Manager.

The application program layer 1250 may include basic applications, for example, an e-mail client, a short message service (SMS) program, a calendar, a map, and a browser.

A module implementing the methods of activating the application based on the handwriting input described with reference to FIG. 1 to FIG. 11 may be located in the software block 1240. For example, if a mobile device is based on the Android operating system, the module implementing the methods of activating the application based on the handwriting input may be configured through the Activity Manager.

According to the Android-based configuration, a handwriting mode configuration may be transmitted from the Activity Manager of the soft block 1240 responsible for configuring a screen and processing an event to HW Touch, Linux Kernel, Android Runtime, and Activity Manager sequentially.

Figure 13:
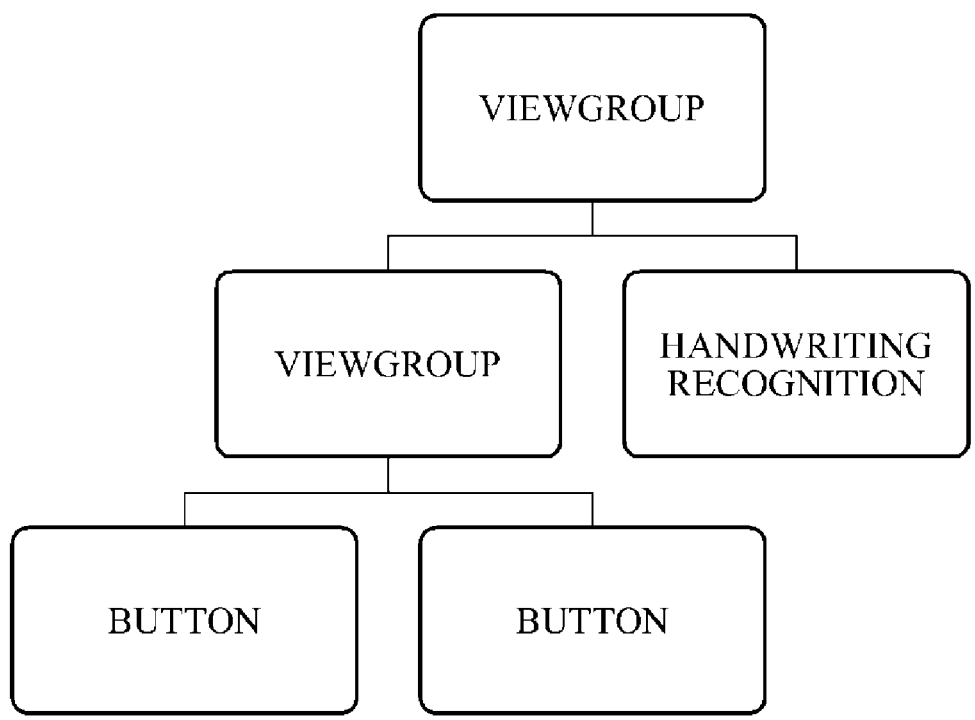
FIG. 13 illustrates a configuration of a View Group of the Activity Manager according to an exemplary embodiment of the present invention.

FIG. 13 illustrates a configuration of a View Group of the Activity Manager according to an exemplary embodiment of the present invention.

The Activity Manager manages the View Group.

If a touch event is transmitted to the Activity Manager, the event is transmitted to a lower View or a lower View Group.

The touch event is also transmitted to the touch recognition unit of the handwriting recognition module of FIG. 9 and a Button View of the lower View. If a Touch Down occurs in a button area and then a Touch Up occurs within the area, the event is recognized as a selection of the button, and thus a button action may be activated.

A handwriting input area and a button area may be distinguished from each other on the screen of the touch screen display, or the entire display region may be used as the handwriting input area without separating the button area.

If the button area is separated, the selection of a button may be distinguished from other types of recognition of a touch, and thus an entire area other than the button area may be activated or inactivated. Thus, without activating only the button area, such as a reply button, when a text message is received, an area for receiving a handwriting input other than the button area may also be activated.

For example, the user may input a handwriting input and then touch a button while talking over the phone.

The handwriting input may be configured to be received in the area other than the button area, where a functional button, e.g., a call button/end button, is disposed on the screen of the touch screen display. For example, the terminal may divide the screen of the touch screen display into multiple areas to provide the user with an area for receiving a handwriting input and an area for button touch. For example, an area where an icon is disposed may be the area for a button, which is distinguished from another button area or the area for receiving a handwriting input. A terminal may determine a touch event detected through the area for receiving a handwriting input as a handwriting input. As such, if a handwriting input is configured to be input only in the handwriting input area, it may be determined that a handwriting input is completed as a touch event is made after the completion of the handwriting input in the dedicated handwriting input area. If the icon is touched, the input received on the icon is not determined as a handwriting input and a function of the icon may be performed without analyzing whether the input corresponds to a handwriting input.

If the entire display area is configured to receive a handwriting input without distinguishing the handwriting input area from the button area, the user may not be able to select an icon to be selected by the user after a handwriting input even though the icon is displayed on because the icon may be hidden under the transparent handwriting input area. For example, the user may need to wait for a period of time to elapse until a handwriting input is completely recognized. In this case, the handwriting input may not be linked to an application before completing the recognition of the handwriting input.

If the user presses a menu of an application or an application icon within a predetermined time after receiving a handwriting input on the handwriting input area, the terminal may temporarily analyze and store contents of the handwriting input, and link the handwriting input to the application when the application or the application icon is selected within the predetermined time. The terminal may display a pop-up message asking whether to temporarily store the contents of the handwriting input or the terminal may display a list of linkable applications, which are not disposed on the home screen, through a pop-up message or a list to the user. The handwriting input may be provided to an application selected by the user as a target application among the list of the applications displayed to the user.

Further, if the entire display area is used for receiving a handwriting input without distinguishing the handwriting input area from the button area, the terminal may generate a layer for displaying a menu of an application or an application icon or a layer for button input separately from a layer for receiving the handwriting input to enable a handwriting input to be input through the separate transparent layer. The transparent layer for the handwriting input may be disposed on the layer for the menu of an application, the application icon or a button when the handwriting input is activated such that the entire screen can be used as the handwriting input area.

Further, according to a type of a handwriting input, a menu of associated applications or associated application icons may be displayed. Specifically, if the user inputs numbers without a character as a handwriting input, an application related to a dial, e.g., a call application, may be displayed. Different types of applications may be further recommended or displayed when characters are input as a handwriting input.

Figure 14:
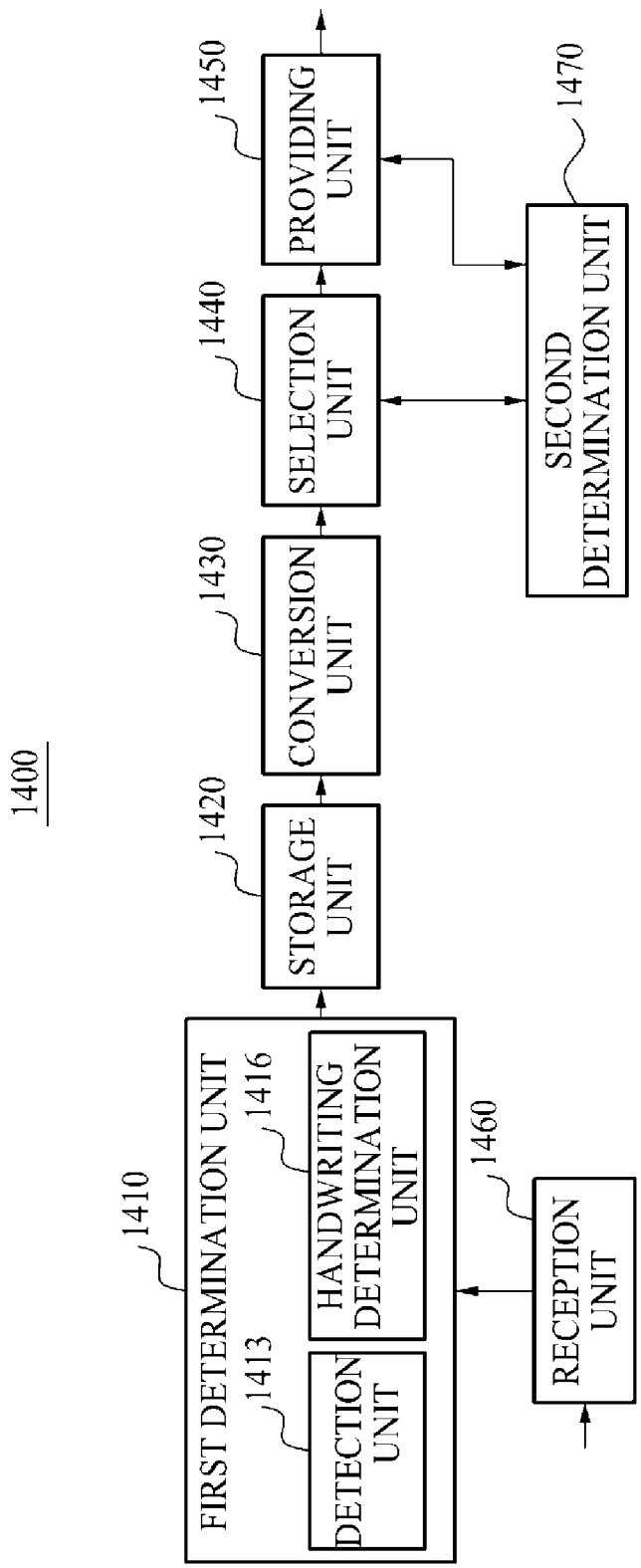
FIG. 14 is a block diagram of a terminal to activate an application based on a handwriting input according to an exemplary embodiment of the present invention.

FIG. 14 is a block diagram of a terminal to activate an application based on a handwriting input according to an exemplary embodiment of the present invention.

Referring to FIG. 14, the terminal 1400 includes a first determination unit 1410, a storage unit 1420, a conversion unit 1430, a selection unit 1440, and a providing unit 1450. Further, the terminal 1400 may further include a reception unit 1460 and a second determination unit 1470.

The first determination unit 1410 determines whether a touch event occurring in a touch recognition area of a touch screen display (not shown) is a handwriting input. If the touch recognition area is a preset area of the touch screen display, the preset area may be independently allocated to a target application. The preset area may be independently allocated to the target application. Further, the touch recognition area may be the entire touch recognition area of the touch screen display.

The first determination unit 1410 may include a detection unit 1413 and a handwriting determination unit 1416.

The detection unit 1413 may detect the touch event from the touch screen display.

The handwriting determination unit 1416 may activate a handwriting recognition module to determine whether the touch event is a valid handwriting input or a simple touch. The handwriting recognition module may detect the touch event occurred in the preset area to determine whether the touch event is a valid handwriting input.

If a recognized touch event corresponds to a text, e.g., a character, a number or a defined symbol, when converted by a handwriting conversion engine, the touch event may be a valid handwriting input.

The storage unit 1420 stores the converted text and may temporarily store the text until the text is associated with the target application based on handwriting input settings.

The conversion unit 1430 converts the handwriting input into a text. The conversion unit 1430 may convert the handwriting input into a text using the handwriting conversion engine when the touch event is determined to be a handwriting input. The "handwriting conversion engine" may include a software engine, which calculates a value corresponding to a coordinate acquired from the touch event occurred on the touch screen display to convert the touch event into a text.

The conversion unit 1430 may convert the handwriting input into a text using the handwriting conversion engine. The conversion may be performed when the input of handwriting is completed or the conversion may be performed during the occurrence of the touch event. The text converted by the conversion unit 1430 may be stored in the storage unit 1420.

The selection unit 1440 selects the target application among a plurality of applications according to a setting or a selection of a user.

The providing unit 1450 provides the text to the target application.

The reception unit 1460 may receive an additional input of handwriting in the touch recognition area of the touch screen display after the converted text is provided to the target application.

The second determination unit 1470 may determine whether the text is a valid input for the target application based on registration information of the target application.

Further, the second determination unit 1470 may determine whether a function of the target application corresponding to the text exists based on information about functions of the target application included in the registration information.

Further, according to aspects of the present invention, one or more processors (not shown) may be included in the terminal to process one or more operations described above. For example, the one or more processors may execute a portion of or all the operations of the determination units 1410 and 1470, the conversion unit 1430, the selection unit 1440, and the providing unit 1450. Further, a processor may determine whether the handwriting input corresponds to a message to be transferred to another user. If the handwriting input is determined to be a message to be transferred to another user, e.g., contents of a reply message, the image of the handwriting input may be transferred to the other user without converting the handwriting input into a symbol, e.g., a text message.

A touch panel to receive a handwriting input may be provided on the terminal. The touch panel may be a touch screen display to receive a touch input including the handwriting input and to display various images. A separate touch panel may be provided on the terminal to receive the handwriting input, and a touch screen display or a display may be separately provided. A touch panel may be a touch recognition device and may include or may not include a display. Further, the handwriting recognition module may be activated according to an occurrence of an event and/or a detection of an input. For example, if the first determination unit 1410 recognizes a defined symbol, e.g., an alphabet 'c', from a touch input received on a touch panel or a touch screen display, the first determination unit 1410 may activate the handwriting recognition module based on the event. A hardware key or a touch-sensing button disposed on a terminal or a software button displayed on the touch screen display may be associated with the initiation of the handwriting recognition module. If one of the keys and buttons are pressed or touched by a user, a handwriting recognition mode may be initiated.

As described above, a handwriting input may be converted into a symbol, such as a text, and the converted text may be displayed on a screen. If an error in the converted text is recognized by a user, the user may correct the error by inputting a correction input on the terminal. For example, the user may touch the touch panel to generate the correction input on the location corresponding to the erroneously recognized symbol. Referring to FIG. 7, if the user wishes to erase the symbol "?", the user may generate a "strikethrough" touch input on the touch screen corresponding to the location of the handwriting input "?". If the user wishes to erase "HI,", the user may generate a "strikethrough" touch input on the touch screen corresponding to the location of the converted text "HI,".

The user may input a handwriting input into multiple fields. For example, the user may input a first handwriting input, "7032001004", and a second handwriting input, "John". The first handwriting input and the second handwriting input may be stored as a first data field and a second data field, respectively. The first handwriting input and the second handwriting input may be distinguished by changing a line when inputting the first and second handwriting inputs, but aspects are not limited thereto. If the user selects an application or an icon of the application, after generating the first and second handwriting inputs, the two data fields may be associated with the selected application. For example, if the user writes "7032001004" in the first line, writes "John" in the second line, and selects a contact application, contact information of another user, John, may be stored in the contact application. Further, if the user selects multiple applications or icons thereof, after generating the first and second handwriting inputs, the two data fields corresponding to the first and second handwriting inputs may be associated with the selected multiple applications. Further, the first data field corresponding to the first handwriting input and the second data field corresponding to the second handwriting input may be associated with a first selected application and a second selected application, respectively.

The methods according to the exemplary embodiments may be recorded in computer-readable media including program instructions to implement various operations embodied by a computer. The media may also include, alone or in combination with the program instructions, data files, data structures, and the like. The media and program instructions may be those specially designed and constructed for the purposes of the present invention, or they may be of the kind well-known and available to those having skill in the computer software arts. Examples of computer-readable media include magnetic media such as hard disks, floppy disks, and magnetic tape; optical media such as CD ROM discs and DVD; magneto-optical media such as floptical discs; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described embodiments of the present invention, and vice versa.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A method for controlling an application based on a handwriting input, the method comprising:
displaying a first screen on a touch screen display of a terminal;
determining an occurrence of a communication event associated with an application, the communication event occurring while displaying the first screen;
displaying a notification indicating the communication event on the touch screen display in response to the determination while displaying the first screen;
activating, in response to the determination, a handwriting recognition module to recognize a handwriting input to be associated with the application when displaying the notification;
receiving the handwriting input on the touch screen display of the terminal;
recognizing the handwriting input received on the touch screen display of the terminal;
determining a symbol corresponding to the handwriting input;
associating the symbol with a function of the application; and
processing the associated symbol through the application.

2. The method of claim 1, further comprising:
activating the function of the application using the symbol.

3. The method of claim 1, further comprising:
displaying an icon of the application on the touch screen display; and
receiving the handwriting input on the touch screen display while displaying the icon of the application.

4. The method of claim 3, wherein the function of the application is configured to be activated in association with the determined symbol if the icon of the application is selected after receiving the handwriting input.

5. The method of claim 3, wherein the application is configured to be executed in a foreground state if the icon of the application is selected without receiving the handwriting input.

6. The method of claim 1, further comprising:
displaying the handwriting input on an upper layer of the first screen displayed on the touch screen display.

7. The method of claim 1, further comprising:
determining a received touch input as the handwriting input if the received touch input corresponds to a defined symbol; and
displaying the received touch input and converting the received touch input into the defined symbol if the received touch input is determined as the handwriting input.

8. The method of claim 7, further comprising:
performing a touch operation in response to the received touch input if the received touch input is not determined as the handwriting input.

9. The method of claim 1, further comprising:
displaying a first application associated with a number if the determined symbol includes the number without including a character; and
displaying a second application associated with a character if the determined symbol includes the character.

10. The method of claim 1, wherein the communication event is receipt of a message.

11. The method of claim 1, wherein the processing of the associated symbol through the application is performed while displaying the first screen on the touch screen display.

12. The method of claim 1, wherein the application is executed in a background state.

13. A method for controlling an application based on a handwriting input in a first terminal, the method comprising:
determining an occurrence of a communication event while displaying a screen of a first application on a touch screen display of the first terminal, the communication event being associated with a second application;
displaying a notification indicating the communication event on the touch screen display of the first terminal in response to the determination while displaying the screen of the first application;
activating, in response to the determination, a handwriting recognition module to recognize a handwriting input to be associated with the second application when displaying the notification;
receiving the handwriting input on the touch screen display of the first terminal;
determining a symbol corresponding to the handwriting input;
associating the symbol with a function of the second application; and
processing the associated symbol through the second application.

14. The method of claim 13, wherein the handwriting input is received without launching the second application.

15. The method of claim 13, wherein the communication event is receipt of a message from a second terminal.

16. The method of claim 15, wherein the processing of the associated symbol through the second application comprises transmitting the associated symbol to the second terminal through the second application, and
the second application is message application.

17. The method of claim 15, further comprising:
transmitting a reply message to the second terminal, the reply message comprising a text corresponding to the symbol.

18. The method of claim 17, further comprising:
displaying a result of the reply message transmitting action,
wherein the displayed result of the reply message transmitting action comprises a message corresponding to the handwriting input.

19. A terminal to control an application based on a handwriting input, the terminal comprising:
a touch screen display to display a first screen and to display a notification indicating a communication event associated with an application while displaying the first screen, the communication event occurring while displaying the first screen;

a determination unit to activate a handwriting recognition module, in response to the communication event, to recognize a handwriting input to be associated with the application during display of the notification, to receive the handwriting input on the touch screen display of the terminal, to recognize the handwriting input received on the touch screen display of the terminal, and to determine a symbol corresponding to the handwriting input; and a processor to associate the symbol with a function of the application, and to process the associated symbol through the application.

20. The terminal of claim 19, wherein the handwriting input is received on the touch screen display before selecting or executing the application.

\* \* \* \* \*